358-74 OR 3,767,854 SR

United States Patent [19]

Stark, Jr. et al.

[11] 3,767,854

[45] Oct. 23, 1973

[54] DELAY OF VIDEO AMPLIFIER D.C. BIAS CHANGE TO ACCOMODATE RISE/FALL OF KINESCOPE HIGH VOLTAGE AFTER TURN ON/OFF OF RECEIVER

[75] Inventors: John Stark, Jr., Robert Joseph Gries, both of Indianapolis, Ind.

[73] Assignee: RCA Corporation, New York, N.Y.

[22] Filed: Oct. 2, 1972

[21] Appl. No.: 293,759

[52] U.S. Cl. ......... 178/5.4 R, 178/DIG. 11, 330/22, 328/258

[51] Int. Cl. ......... H04n 5/44

[58] Field of Search ......... 178/DIG. 11, 5.4 R, 178/7.5 R; 325/492; 328/258; 315/22, 13 CG; 330/22, 40

[56] References Cited

UNITED STATES PATENTS

| | | | |
|---|---|---|---|
| 3,452,281 | 6/1969 | Weischedel | 330/22 |
| 3,535,445 | 10/1970 | Griffery | 178/7.5 R |
| 3,671,878 | 6/1972 | Becker | 330/22 |
| 3,714,601 | 1/1973 | Minton | 330/40 |

*Primary Examiner*—Robert L. Griffin
*Assistant Examiner*—Richard Maxwell
*Attorney*—Eugene M. Whitacre et al.

[57] ABSTRACT

A resistance-capacitance time constant network automatically delays the conductivity of a television kinescope when the receiver is turned-on and maintains its conductivity after the receiver is turned-off. The delay in conductivity exists to permit its applied high voltage to first rise to a value to attract electrons towards the faceplate, while maintaining the conductivity permits complete discharge of any high voltage stored on its internal capacitance.

5 Claims, 1 Drawing Figure

T6544

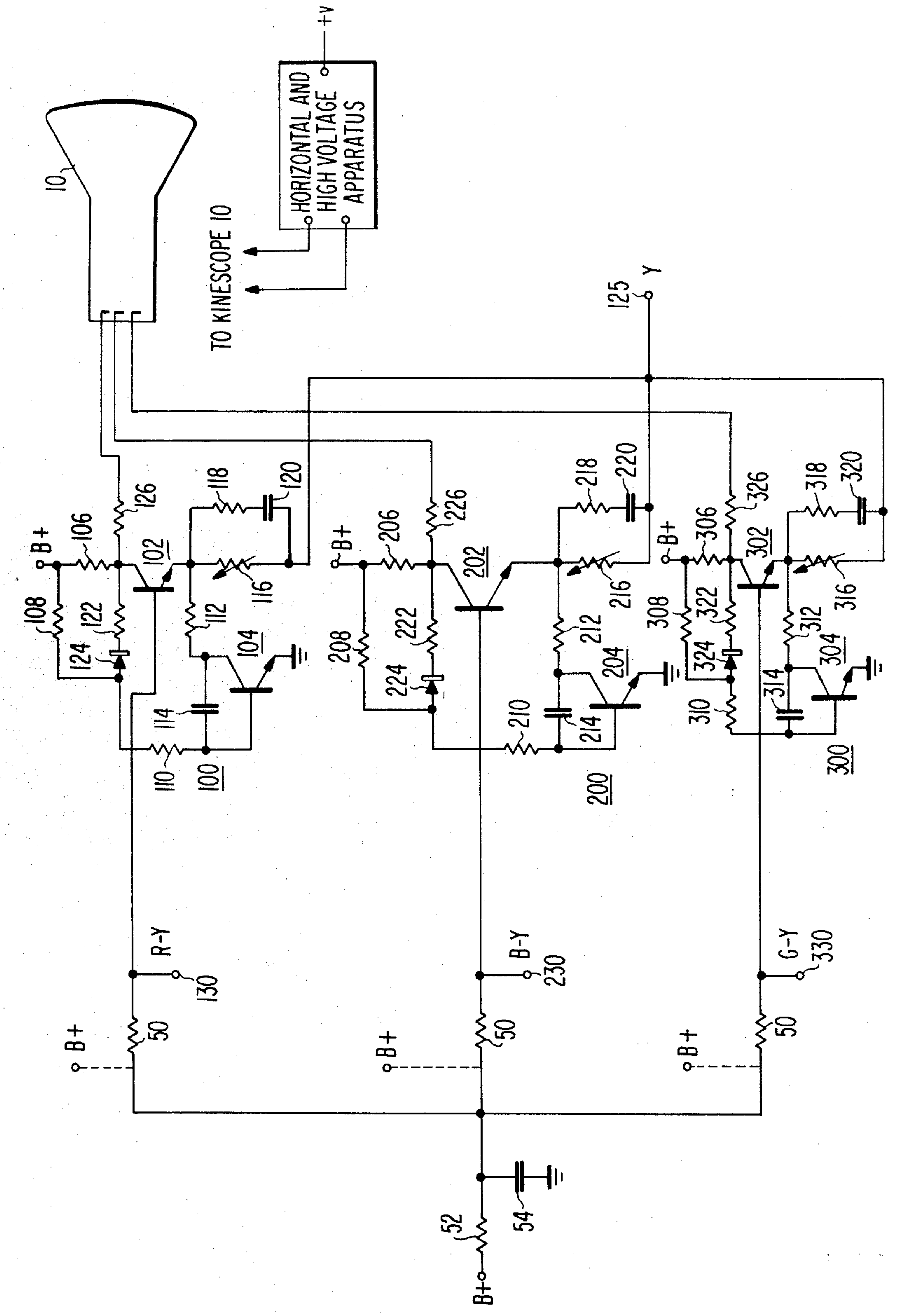
HORIZONTAL AND HIGH VOLTAGE APPARATUS
+V
TO KINESCOPE 10
Y
R-Y
B-Y
G-Y
B+

DELAY OF VIDEO AMPLIFIER D.C. BIAS CHANGE TO ACCOMODATE RISE/FALL OF KINESCOPE HIGH VOLTAGE AFTER TURN ON/OFF OF RECEIVER

FIELD OF THE INVENTION

This invention relates to television receiver circuits and, more particularly, to a control circuit for use in receiver environments where the kinescope rises to its full emission capability with a rapidity sufficiently close to that of the various signal processing stages employed to warrant an "instant-on" characterization.

SUMMARY OF THE INVENTION

As will become clear hereinafter, the control circuit of the present invention represents a modification of apparatus described in U.S. Pat. No. 3,619,488–Willis (assigned to the same assignee as is the invention of this case)—and, as such, affords a means of controlling kine-scope conductivity both at receiver turn-on and turn-off so as to reduce objectionable flashing at the kinescope neck.

To be more specific, a preferred embodiment of the present invention will be seen to incorporate a resistance-capacitance time constant network to delay kinescope conductivity when the receiver is first turned-on, until after the high voltage applied to its ultor electrode has risen sufficiently to attract electrons from its gun to its faceplate. The network, at the same time, will additionally be seen to maintain kinescope conductivity after the receiver has been turned-off, until sufficient time has passed to discharge any high voltage stored on its internal capacitance. When used in connection with the apparatus of the aforementioned U.S. Pat. No. 3,619,488, this time constant network can be readily incorporated in the input electrode circuits of the driver stage transistors there employed.

BRIEF DESCRIPTION OF THE DRAWING

These and other features of the present invention will be more clearly understood from a consideration of the following description taken in connection with the single FIGURE of the drawing showing a portion of the color television receiver apparatus of the U.S. Pat. No. 3,619,488, as modified by a preferred embodiment of this invention to control kinescope conductivity.

DETAILED DESCRIPTION OF THE DRAWING

REferring to the drawing—in which the color kinescope is represented by the reference numeral 10—, it will be seen that three identical driver stages 100, 200, 300 are employed. For the sake of simplicity, only the stage 100 will be described, the corresponding components for driver stages 200 and 300 being denoted by corresponding reference numerals differing only in their most significant digit.

Thus, driver stage 100 includes an output transistor 102 and a bais transistor 104. A source of positive B+ potential is coupled to the collector electrode of transistor 102 by a resistor 106, while serially coupled resistors 108, 110 couple this source to the base electrode of transistor 104. A further resistor 112 couples the emitter electrode of transistor 102 to the collector electrode of transistor 104, from which point a capacitor 114 is coupled to the base electrode of that same transistor. Whereas the emitter electrode of transistor 104 is directly connected to a point of reference of ground potential, the emitter electrode of transistor 102 is coupled, on the one hand, by a variable resistor 116 and, on the other hand, by the series combination of a resistor 118 and a capacitor 120, to a source of luminance, or Y, signals 125. A further series connection of a resistor 122 and a semiconductor rectifier 124 is coupled between the collector electrode of transistor 102 and the junction of resistors 108, 110, where the anode electrode of the rectifier 124 is joined. With color difference signals being applied to the base electrode of transistor 102 from a chrominance demodulator source 130, the driver stage construction is completed by the connection of an output resistor 126 from the collector electrode of transistor 102 to the cathode electrode of the kinescope 10.

As described in U.S. Pat. No. 3,619,488 (the disclosure of which is herein incorporated by reference), received color television signals are translated in part by this apparatus to the application of color image signals to the kinescope for reproduction thereby. The three stages then may comprise red, green and blue kinescope drivers, respectively.

While the described apparatus of that patent operates quite satisfactorily and in the intended manner, it has been found that further improvements can be had by the additional inclusion of a resistor 50, coupled, as shown in dotted lines, between the base electrode of transistor 102 (i.e., at input electrode 130) and the B+ potential source. By selecting the value of the B+ potential source to be greater than the value used to energize the horizontal deflection circuitry and high voltage transformer of the receiver—for example, +220 volts as compared to +160 volts—, the added resistor 50 will tend to maintain the kinescope conductive even when the receiver is turned-off and the deflection and high voltage circuits are being shut down. This follows for the reason that the B+ source will decay at a slower rate than the +V potential source for the horizontal and high voltage cirucitry, and the bias current needed to sustain the conductivity of the kinescope driver transistor 102 will continue to flow from the B+ source through resistor 50 for a longer period of time. Any high voltage which was stored in the internal capacitance of the kinescope will thus continue to be discharged through the kinescope for a time after the receiver has been turned-off. In other versions of the apparatus, potential sources having values equal to, or less than, that for the deflection and high voltage circuitry may be employed, provided their relative output time constants are such that the rate at which the B+ voltage decays is slower than the rate at which the +V voltage decays by the necessary amount.

While such additional resistor has functioned in its intended manner, the preferred embodiment of this invention also includes a resistance-capacitance time constant network coupled between the B+ potential source and the end of resistor 50 which is remote from the base electrode of transistor 102, the previous connection from there to the B+ source being removed. Such inclusion of the time constant network adds another feature to the invention for specific employment in a television receiver of the "instant-on" variety. In such a receiver, the filament of the kinescope has applied to it a potential of approximately 5 volts while the set is turned-off. When the receiver is then turned-on, the biasing into conduction of transistor 102 rapidly causes the kinescope 10 to conduct, and at a time at which insufficient high voltage has yet to be developed to draw the electrons from the gun towards the faceplate. In such instances, the emitted electrons may very well strike the neck of the kinescope at the gun area, and cause objectionable, bright flashing. Incorporation of the time constant network including, for example, a resistor 52 connected at one end to the B+ source and at the other end to a capacitor 54 which is referenced to ground effectively serves, however, to delay the bias current flowing through resistor 50 to the base electrode of transistor 102 to render kinescope 10 conductive until after the high voltage has risen to a high enough value to attract emitted electrons towards the kinescope faceplate. Such arrangement offers the additional advantage that the positive voltage stored on capacitor 54 is in a direction to maintain the driver transistor 102 conducting for a longer period of time after the receiver has been turned-off, to further insure complete discharge of any high voltage stored in the kinescope.

While applicant does not wish to be limited to any particular set of values, the following have proved suitable for incorporation in the CTC–60 color television receiver manufactured by the RCA Sales Corporation of Indianapolis, Ind.:

| Component | Value |
|---|---|
| Resistor **106** | 10 kilohms |
| Resistor **108** | 2.2 megohms |
| Resistor **110** | 220 kilohms |
| Resistor **112** | 180 ohms |
| Resistor **118** | 100 ohms |
| Resistor **122** | 3.9 kilohms |
| Resistor **126** | 100 ohms |
| Resistor **50** | 390 kilohms (when used alone) 39 kilohms (when used with time constant network) |
| Resistor **52** | 180 kilohms |
| Capacitor **114** | 1.2 microfarads |
| Capacitor **120** | 680 micromicrofarads |
| Capacitor **54** | 0.47 microfarads |
| B+ Potential Source | +220 volts |
| +V Potential Source | +160 volts |
| Kinescope **10** | 19VCTP22 |

In such apparatus, the B+ potential source exhibited a 6 second or so delay in decaying from its 220 volt value to approximately 40 percent thereof, while the +V source exhibited a delay on the order of tens of milliseconds in decaying 60 percent from its initial 160 volt value.

While there have been described what are considered to be preferred embodiments of the present invention, it will be readily apparent to those skilled in the art that other modifications may be made without departing from the teachings herein of maintaining a color television kinescope relatively conductive after the receiver has been turned-off (so as to permit continued discharge of stored high voltage) while, at the same time, maintaining it reatively non-conductive at initial turn-on of the receiver (so as to reduce objectionable flashing when the receiver is used in an "instant-on" mode of operation.)

What is claimed is:

1. In display equipment having a kinescope cooperating with high voltage and horizontal deflection system apparatus for reproducing a picture image from received video signal informations representative thereof, and wherein said high voltage and deflection system apparatus are each energized from a first source of energizing potential, the combination therewith of:

a transistor amplifier having an input electrode coupled to receive video signals for reproduction and an output electrode coupled to apply picture drive signals to an input electrode of said kinescope;

a second source of energizing potential;

and delay means coupled between the input electrode of said transistor amplifier and said second source of energizing potential to provide a bias current for said amplifier from said second source;

the decay time of said second source of energizing potential being in excess of that of said first source of energizing potential, to combine with said delay means in maintaining said display kinescope conductive even after said equipment is turned-off, due to the slower rate of decay of voltage provided by said second source of potential as compared to that provided by said first source of potential and in inhibiting the conductivity of said display kinescope when said equipment is turned-on, due to the limiting of bias current for said transistor amplifier.

2. The combination of claim 1 for use in a television receiver of the type employing a kinescope having a filament to which an energizing potential is applied even when said receiver is turned-off, wherein said delay means is coupled between the input electrode of said transistor amplifier and said second source of energizing potential via a resistance means, and wherein said resistance and delay means cooperate to limit the bias current for said transistor amplifier as will delay said display kinescope from becoming conductive when said receiver is turned-on until after said first source of energizing potential increases to that value necessary to operate said high voltage and horizontal deflection system apparatus.

3. The combination of claim 2 wherein said delay means comprises a resistance-capacitance time constant network.

4. The combination of claim 3 wherein said resistance means comprises a first resistor and wherein said resistance-capacitance time constant network includes a second resistor and a capacitor, with one end of said first resistor being connected to the input electrode of said transistor amplifier, with the other end of said first resistor being connected between the junction of one end of said second resistor with one end of said capacitor, with the other end of said second resistor being connected to said second source of energizing potential and with the other end of said capacitor being connected to a point of reference potential.

5. The combination of claim 4 for use in a color television receiver wherein color difference signals are applied to said input base electrode of said transistor amplifier, wherein luminance signals are applied to a common emitter electrode of said amplifier, and wherein reproduced color signals are developed at said output collector electrode of said transistor amplifier.

* * * * *